United States Patent [19]

Watanabe

[11] Patent Number: 4,471,611
[45] Date of Patent: Sep. 18, 1984

[54] SOOT CATCHER PURGATIVE DIESEL ENGINE INTAKE THROTTLING METHOD AND APPARATUS UTILIZING TIME DELAY

[75] Inventor: Noboru Watanabe, Toyota, Japan

[73] Assignee: Toyota Jidosha Kabushiki Kaisha, Toyota, Japan

[21] Appl. No.: 429,182

[22] Filed: Sep. 30, 1982

[30] Foreign Application Priority Data

Apr. 28, 1982 [JP] Japan .................................. 57-72028

[51] Int. Cl.³ ........................... F01N 3/02; F01N 3/22
[52] U.S. Cl. ........................................ 60/274; 60/285;
60/311; 123/376; 123/399; 123/401; 123/403
[58] Field of Search .......................... 60/274, 285, 311;
123/341, 376, 399, 400, 401, 403

[56] References Cited

U.S. PATENT DOCUMENTS 4,211,075 7/1980 Ludecke .............................. 60/311

Primary Examiner—Douglas Hart
Attorney, Agent, or Firm—Oblon, Fisher, Spivak, McClelland & Maier

[57] ABSTRACT

A method for intake throttling for a diesel engine provided with an exhaust gas soot catcher, which also has an intake throttle valve for restricting intake air, thus heating the exhaust gases for purging the soot catcher. When the soot catcher is clogged with soot, throttling operation of the intake throttling valve is commenced after a first time period has elapsed after the point which represents the current operational condition of the diesel engine in a phase space whose dimensions are certain operating parameters of the diesel engine has transited from a first region representing non intake throttling combinations of these certain operating parameters to a second region, the complement of the first region, representing intake throttling combinations of these operating parameters; and/or such throttling operation of the intake throttling valve is ceased after a second time period has elapsed after this point has transited to this first region from this second region. Thus at proper times the soot catcher is heated up by heating up of the exhaust gases, with a proper time delay incorporated in this heating up of the exhaust gases, and is purged by combusting the accumulation of soot particles in it; and/or the heating up of the soot catcher to purge it is terminated by termination of the heating up of the exhaust gases, with a proper time delay incorporated in this termination of heating up of the exhaust gases. Apparatus is also described for practicing this method.

6 Claims, 2 Drawing Figures

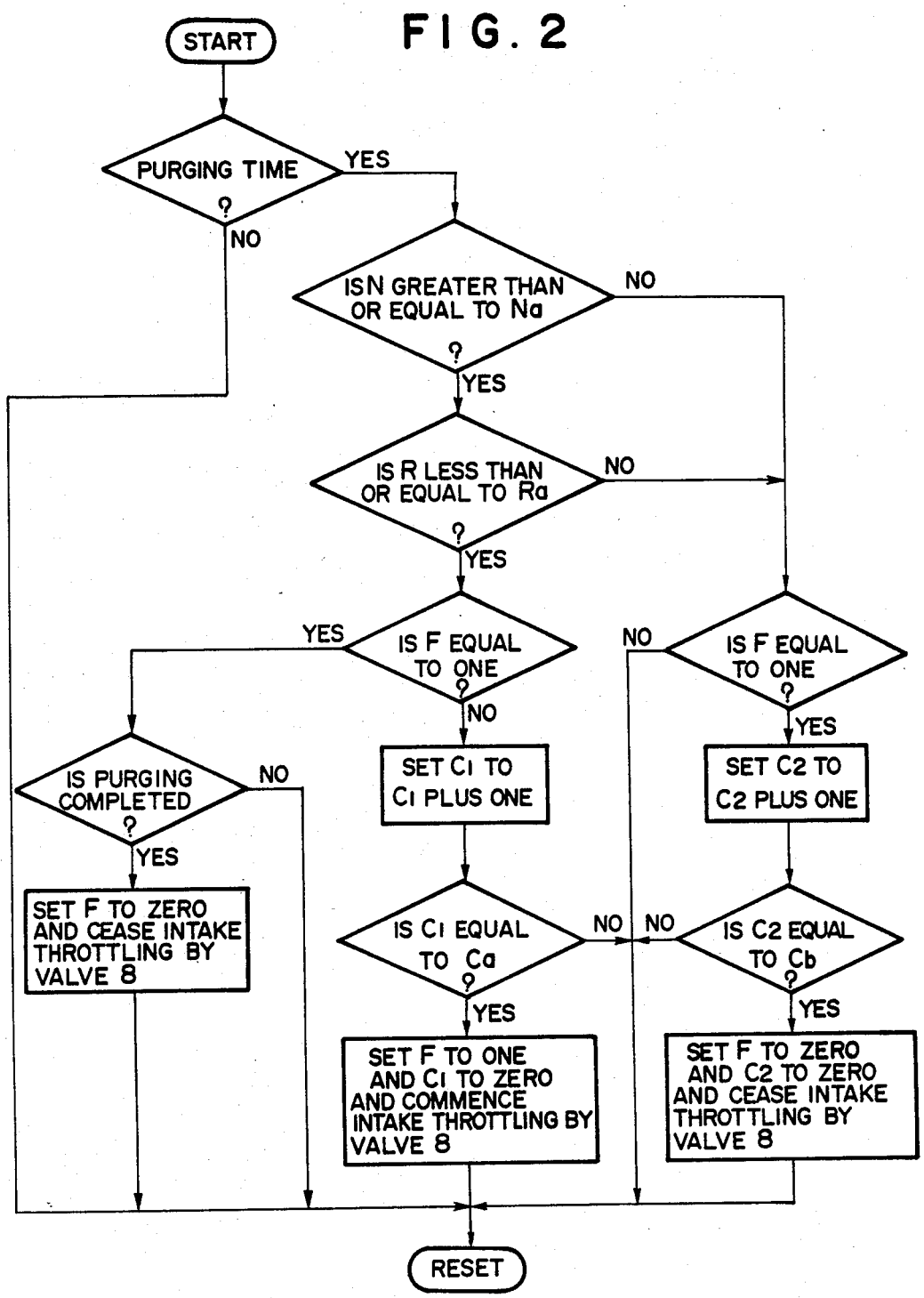

SOOT CATCHER PURGATIVE DIESEL ENGINE INTAKE THROTTLING METHOD AND APPARATUS UTILIZING TIME DELAY

BACKGROUND OF THE INVENTION

The present invention relates to a method for intake throttling for a diesel internal combustion engine, and, more particularly, relates to a novel method for intake throttling for a diesel internal combustion engine which is fitted with a soot catcher of a per se well known sort, which is adapted to purge the soot catcher, without running the risk of causing the emission of smoke and soot. The present invention also relates to apparatus for performing the above mentioned diesel internal combustion engine intake throttling method.

Nowadays, it is common and conventional to provide a soot catcher to the exhaust system of a diesel internal combustion engine. Such a soot catcher catches and accumulates carbon particles and other solid particles present in the exhaust gases of the diesel internal combustion engine, and prevents their escape to the atmosphere. Since it is becoming more and more realized nowadays that such soot particles such as carbon particles may present a significant health hazard to the public, the provision of such a soot catcher is very important from the environmental and public health point of view.

Such a soot catcher normally has a filter like structure for catching the soot particles, and naturlly this filter structure inevitably tends to become clogged up, over a long period of use of the soot catcher, with an accumulation of soot particles, chiefly carbon particles. When this happens, not only does the efficiency of the soot catcher for purifying the exhaust gases of the diesel internal combustion engine of soot particles drop drastically, but also the resistance of the soot catcher to the flow therethrough of exhaust gases increases, which deteriorates the actual operation of the diesel internal combustion engine, causing its breathing efficiency to drop, which causes a loss of engine power. This has presented a serious problem with regard to such a soot catcher; either it has been necessary to regularly remove the soot catcher in order to clean it, which is dirty, expensive, and troublesome; or some sysem has had to be provided for cleaning or purging the soot catcher in situ, without removing it from the engine.

It is possible to purge such a soot catcher by burning out the combustible soot particles such as carbon particles which are clogging the filter structure of the soot catcher by increasing the temperature of the exhaust gases passing through the soot catcher above the ignition temperature of said combustible soot particles.

During normal operation of the diesel internal combustion engine, when the load on the diesel internal combustion engine rises to a high load level wherein the excess air ratio in the exhaust gases becomes small, it is quite possible for the temperature of the exhaust gases passing through the filter structure of the soot catcher to spontaneously rise above the ignition temperature of the soot particles clogging the soot catcher, without the provision of any special means for raising the temperature of said exhaust gases. In this case, purging of the soor catcher as described above may spontaneously occur, by burning out said soot particles lodged therein as a clogging accumulation. However, this spontaneous self purging process cannot be relied upon. Diesel engines, especially in automotive vehicles, are only irregularly operated in high load conditions; and when an automotive vehicle is being operated in urban traffic it is quite unusual for the diesel internal combustion engine thereof to be operated in the high load operational region. Thus such spontaneous self purging of a soot catcher might not occur in time to purge the soot catcher before its clogging had unacceptably deteriorated the functioning of the diesel internal combustion engine to which it was fitted. Therefore it is necessary to practice some particular special and reliable method for raising the temperature of the exhaust gases of the diesel internal combustion engine to a temperature higher than the ignition temperature of the soot particles which are becoming lodged in the soot catcher thereof, in order reliably to purge said soot catcher whenever it becomes clogged.

A first such prior art method for raising the temperature of the exhaust gases of a diesel internal combustion engine to a temperature higher than the ignition temperature of the soot particles which are becoming lodged in the soot catcher thereof in order to purge said soot catcher has been to delay the timing of fuel injection to the diesel internal combustion engine.

However, this first prior art soot catcher purging method has suffered from the disadvantage that the temperature of the exhaust gases of the diesel internal combustion engine can only be so raised when the engine is operating in a certain range of operational conditions; in other engine operational conditions the temperature of the exhaust gases does not rise up sufficiently to combust the soot particles in the soot catcher, even when fuel injection timing is delayed. Further, delaying the timing instant of fuel injection may hamper the operability of the diesel internal combustion engine, and the drivability of a vehicle to which it is fitted. Accordingly this first purging method is not of very good applicability.

A second such prior art method for raising the temperature of the exhaust gases of a diesel internal combustion engine to a temperature higher than the ignition temperature of the soot particles which are becoming lodged in the soot catcher thereof in order to purge said soot catcher, has been to provide a separate heater, such as an oil burner or other heating device, for heating the exhaust gas up.

However, this second prior art soot catcher purging method has suffered from disadvantages relates to cost, safety, and durability. In practice this solution cannot practicably be used for a diesel internal combustion engine for use in an automotive vehicle.

A third per se well known prior art method for raising the temperature of the exhaust gases of a diesel internal combustion engine to a temperature higher than the ignition temperature of the soot particles which are becoming lodged in the soot catcher thereof in order to purge said soot catcher has been to reduce the amount of excess air which is supplied to the combustion chambers of the diesel internal combustion engine, by limiting the air intake of the engine, as for example by the use of an intake throttling valve or choke valve.

A problem that has arisen with this third per se well known prior art purging method is that it is subject to the limitation that the temperature of the exhaust gases of the diesel internal combuston engine can only be so raised so as to purge the soot catcher when the engine is operating in a certain range of operational conditions;

in other engine operational conditions the temperature of the exhaust gases does not rise up sufficiently to combust the soot particles in the soot catcher, even when the air intake amount of the engine is limited as by the aforesaid intake throttling valve. Further, attention must be paid to the engine operational condition, when practicing this intake throttling method for purging the soot catcher, in order not to run the risk of emission of large quantities of soot and black smoke. Therefore, a requirement has arisen for a method and apparatus for so controlling the soot purgative operative of the intake air throttling valve as to assure that its intake throttling effect is only deployed in appropriate operational conditions of the diesel internal combustion engine.

SUMMARY OF THE INVENTION

A simple minded method for thus controlling the soot purgative operation of the intake air throttling valve might be conceived of in which, when the soot catcher required to be purged, the range of appropriate operational conditions of the diesel internal combustion engine for deployment of said soot catcher was formulated in terms of appropriate purging and non purging regions for a point representing the current operational conditions of the diesel internal combustion engine in a phase space whose dimensions were the various relevant operational parameters of the diesel internal combustion engine; in such a simple minded method the intake air throttling valve being operated from moment to moment so as to throttle the intake air of the diesel internal combustion engine, or not, according to whether or not said point representing the current operational conditions of the diesel internal combustion engine in said phase space at the moment lies in the purging region of said phase space, or not.

A first characteristic phenomenon which the inventor of the present invention has found with respect to an intake throttling method for heating up the exhaust gases of an diesel internal combustion engine and for thus purging a soot catcher is that in fact in practice the throttling of the intake air of the diesel internal combustion engine is only effective for heating up the exhaust gases of the diesel internal combustion engine in order to purge the soot catcher, after the diesel internal combustion engine has been operating with the point in said phase space representing the current operational conditions of the diesel internal combustion engine lying in the aforesaid purging region of said phase space for a certain predetermined first time period which is of the order of some tens of seconds; on the other hand, before the diesel internal combustion engine has been operating with the point in said phase space representing the current operational conditions of the diesel internal combustion engine lying in the aforesaid purging region of said phase space for said first time period, the throttling of the intake air for said diesel internal combustion engine is ineffective for heating up the exhaust thereof, and may actually cause problems with regard to emission of undesirable amounts of black smoke and the like in the exhaust of the diesel internal combustion engine.

Further, a second characteristic phenomenon which the inventor of the present invention has found with respect to an intake throttling method for heating up the exhaust gases of a diesel internal combustion engine and for thus purging a soot catcher is that also in fact in practice the throttling of the intake air of the diesel internal combustion engine continues to be effective for heating up the exhaust gases of the diesel internal combustion engine in order to purge the soot catcher, even when the diesel internal combustion engine has already ceased to operate with the point in said phase space representing the current operational conditions of the diesel internal combustion engine lying in the aforesaid purging region of said phase space, for another certain second predetermined time period which again is of the order of some tens of seconds, and during this second time period after the diesel internal combustion engine has ceased to operate with the point in said phase space representing the current operational conditions of the diesel internal combustion engine lying in the aforesaid purging region of said phase space there is no substantial risk of the production of substantial amounts of black smoke or soot in the exhaust of the diesel internal combustion engine, and the drivability of the diesel internal combustion engine continues relatively unimpaired, even though intake throttling continues to be performed in order to keep the exhaust gases thereof heated up. On the other hand, after the diesel internal combustion engine has been operating with the point in said phase space representing the current operational conditions of the diesel internal combustion engine lying outside the aforesaid intake throttling purging region of the phase space for said second time period, the throttling of the intake air for said diesel internal combustion engine becomes ineffective for heating up the exhaust thereof, and may actually cause problems with regard to emission of undesirable amounts of black smoke and the like in the exhaust of the diesel internal combustion engine, and with regard to deterioration of the drivability of the diesel internal combustion engine.

A yet further third characteristic phenomenon which the inventor of the present invention has found with respect to an intake throttling method for heating up the exhaust gases of a diesel internal combustion engine and for thus purging a soot catcher is that in circumstances in which the point in said phase space representing the current operational conditions of the diesel internal combustion engine wanders quite quickly and frequently in and out of the aforesaid purging region of said phase space, i.e. in circumstances in which the diesel internal combustion engine operates with the point in said phase space representing the current operational conditions of the diesel internal combustion engine being located in the general region of the boundary between the aforesaid purging region of said phase space and the aforesaid non purging region of said phase space and wandering to and fro over said boundary quite quickly and frequently, and if according to such a simple minded intake throttling method the intake throttling valve for the diesel internal combustion engine is opened or closed to provide more or less intake throttling respectively for the diesel internal combustion engine every time said point in said phase space crosses said boundary, then the intake throttling for the diesel internal combustion engine will be alternately provided and not provided frequently and rapidly—i.e. the provision of intake throttling for the diesel internal combustion engine will oscillate between the present and the non present condition—and this will have a poor effect on the drivability and on the operability of the diesel internal combustion engine, and will deteriorate these desirable operational characteristics.

Accordingly, it is the primary object of the present invention to provide a method for throttling the intake passage of a diesel internal combustion engine equipped with a soot catcher, which utilizes the above mentioned characteristic phenomena so as effectively to purge the soot catcher without causing the emission of smoke and soot and without disturbing operation of the diesel internal combustion engine.

It is a further object of the present invention to provide a method for throttling the intake passage of a diesel internal combustion engine equipped with a soot catcher, which can when required reliably and properly heat up the soot catcher so as to purge it by combusting any accumulation of soot particles which has built up in it.

It is a further object of the present invention to provide a method for throttling the intake passage of a diesel internal combustion engine equipped with a soot catcher, with which the efficiency and effectiveness of purging the soot catcher are kept as high as possible.

It is a further object of the present invention to provide a method for throttling the intake passage of a diesel internal combustion engine equipped with a soot catcher, in which such throttling to cause purging and regeneration of the soot catcher, when such purging is needed for said soot catcher, is performed only when the operational circumstances of the diesel internal combustion engine are in fact appropriate for such throttling.

It is a further object of the present invention to provide a method for throttling the intake passage of a diesel internal combustion engine equipment with a soot catcher, in which such throttling to cause purging and regeneration of the soot catcher, when such purging is needed for said soot catcher, is performd taking into account not only the instant by instant operational conditions and parameters of the diesel internal combustion engine, but also taking into account the past history of said operational conditions of the diesel internal combustion engine.

It is a furthr object of the present invenion to provide a method for throttling the intake passage of a diesel internal combustion engine equipped with a soot catcher, in which such throttling to cause purging and regeneration of the soot catcher, when such purging is needed for said soot catcher, is started to be performed only after a certain time after the operational conditions and parameters of the diesel internal combustion engine have been appropriate for such purging to occur.

It is a further object of the present invention to provide a method for throttling the intake passage of a diesel internal combustion engine equipped with a soot catcher, in which such throttling to cause purging and regeneration of the soot catcher, when such purging is needed for said soot catcher, is ceased to be performed only after a certain time after the operational conditions and parameters of the diesel internal combustion engine have ceased to be appropriate for such purging to occur.

It is a further object of the present invention to provide a method for throttling the intake passage of a diesel internal combustion engine equipped with a soot catcher, in which, when such purging is needed for said soot catcher, it is positively avoided that such throttling to cause purging and regeneration of the soot catcher is rapidly and alternatingly performed and not performed.

It is a further object of the present invention to provide a method for throttling the intake passage of a diesel internal combustion engine equipped with a soot catcher, in which, when such purging is needed for said soot catcher, it is positively avoided that oscillation should occur in the provision and the non provision of such intake throttling for said diesel internal combustion engine.

It is a further object of the present invention to provide a method for throttling the intake passage of a diesel internal combustion engine equipped with a soot catcher, for purging the soot catcher, which does not run any substantial risk of the emission of significant quantities of soot and smoke in the exhaust of said diesel internal combustion engine.

It is a further object of the present invention to provide a method for throttling the intake passage of a diesel internal combustion engine equipped with a soot catcher, for purging the soot catcher, which does not present any problems due to safety of the exhaust emissions thereof.

It is a yet further object of the present invention to provide such a method for throttling the intake passage of a diesel internal combustion engine equipped with a soot catcher, for purging the soot catcher, which does not deteriorate the operability of the diesel internal combustion engine.

It is a yet further object of the present invention to provide such a method for throttling the intake passage of a diesel internal combustion engine equipped with a soot catcher, for purging the soot catcher, which does not deteriorate the drivability of a vehicle incorporating the diesel internal combustion engine.

It is a yet further object of the present invention to provide such a method for throttling the intake passage of a diesel internal combustion engine equipped with a soot catcher, for purging the soot catcher, which is cheap and easy to apply.

It is a yet further object of the present invention to provide an apparatus for throttling the intake passage of a diesel internal combustion engine equipped with a soot catcher, for purging the soot catcher, which achieves the above described objects, and others.

Now, according to the most general method aspect of the present invention, these and other objects are accomplished by, for a diesel internal combustion engine comprising a soot catcher and an air intake passage which can be selectively throttled so as to purge said soot catcher by the operation of an intake throttling valve which is provided therein: a method of intake throttling for said diesel internal combustion engine, wherein operation of said intake throttling valve so as to throttle said air intake passage to a greater extent and operation of said intake throttling valve so as to throttle said air intake passage to a lesser extent are switched between after a substantial time period has elapsed after the point which represents the current operational condition of said diesel internal combustion engine in a phase space whose dimensions are certain operating parameters of said diesel internal combustion engine has transited between a first region in said phase space representing non intake throttling combinations of said certain operating parameters of said diesel internal combustion engine and a second region in said phase space representing intake throttling combinations of said certain operating parameters of said diesel internal combustion engine, said second region being the complement of said first region.

According to such a method, as will be understood from what follows, particular beneficial effects are attained with respect to the purging operation of the soot catcher, and consequently benefits are obtained with regard to quality of the exhaust emissions of the diesel internal combustion engine, and with regard to the drivability thereof.

According to a more particular method aspect of the present invention, those of these objects relating to a method, and others, are accomplished by, for a diesel internal combustion engine comprising a soot catcher and an air intake passage which can be selectively throttled so as to purge said soot catcher by the operation of an intake throttling valve which is provided therein: a method of intake throttling for said diesel internal combustion engine, wherein operation of said intake throttling valve so as to throttle said air intake passage is commenced after a first time period has elapsed after the point which represents the current operational condition of said diesel internal combustion engine in a phase space whose dimensions are certain operating parameters of said diesel internal combustion engine has transited from a first region in said phase space representing non intake throttling combinations of said certain operating parameters of said diesel internal combustion engine to a second region in said phase space representing intake throttling combinations of said certain operating parameters of said diesel internal combustion engine, said second region being the complement of said first region.

According to such a method, when said point which represents the current operational condition of said diesel internal combustion engine in said phase space transits from said first region in said phase space representing non intake throttling combinations of said certain operating parameters of said diesel internal combustion engine to said second region in said phase space representing intake throttling combinations of said certain operating parameters of said diesel internal combination engine, the operation of said intake throttling valve, to throttle said air intake passage and thereby to heat up the exhaust gases of said diesel internal combustion engine so as to purge said soot catcher by causing the combustion of soot particles which have accumulated in it, is not immediately started, which would be according to the simple minded concept for operation of said intake throttling valve suggested above, but instead a certain time delay equal to said first time period is allowed to lapse, before said throttling action of said intake throttling valve is started. Thereby it is avoided that undue smoke and soot should be generated during this first time period after first the aforesaid point has transited from said first region to said second region, of which otherwise there might be a danger. Further, in the event that said point in said phase space wanders to and fro between said first region and said second region quickly and repeatedly, this time delay before deploying the intake throttling effect of said intake throttling valve means that oscillation between the intake throtting position and the non intake throttling position of said intake throttling valve is positively avoided, which is very beneficial for improving the drivability and operability of the diesel internal combustion engine, as well as for preserving the quality of the exhaust emissions thereof.

According to another more particular method aspect of the present invention, those of these objects relating to a method, and others, are accomplished by, for a diesel internal combustion engine comprising a soot catcher and an air intake passage which can be selectively throttled so as to purge said soot catcher by the operation of an intake throttling valve which is provided therein: a method of intake throttling for said diesel internal combustion engine, wherein operation of said intake throttling valve so as to throttle said air intake passage is ceased after a second time period has elapsed after the point which represents the current operational condition of said diesel internal combustion engine in a phase space whose dimensions are certain operating parameters of said diesel internal combustion engine has transited to a first region in said phase space representing non intake throttling combinations of said certain operating parameters of said diesel internal combustion engine from a second region in said phase space representing intake throttling combinations of said certain operating parameters of said diesel internal combustion engine, said second region being the complement of said first region.

According to such a method, when said point which represents the current operational condition of said diesel internal combustion engine in said phase space transits from said second region in said phase space representing intake throttling combinations of said certain operating parameters of said diesel internal combustion engine to said first region in said phase space representing non intake throttling combinations of said certain operating parameters of said diesel internal combustion engine, the operation of said intake throttling valve, to throttle said air intake passage and thereby to heat up the exhaust gases of said diesel internal combustion engine so as to purge said soot catcher by causing the combustion of soot particles which have accumulated in it, is not immediately stopped, which would be according to the simple minded concept for operation of said intake throttling valve suggested above, but instead a certain time delay equal to said second time period is allowed to lapse, before said throttling action of said intake throttling valve is stopped. Thereby, since there is no substantial risk of undue smoke and soot being generated during this second time period after first the aforesaid point has transited from said second region to said first region, even though intake throttling is continued, it is advantageously made possible to utilize this time period for purging of the soot catcher, which improves the efficiency and effectiveness of the purging of the soot catcher. Further, in the event that said point in said phase space wanders to and fro between said first region and said second region quickly and repeatedly, this time delay before ceasing the deployment of the intake throttling effect of said intake throttling valve means that oscillation between the intake throttling position and the non intake throttling position of said intake throttling valve is positively avoided, which is very beneficial for improving the drivability and operability of the diesel internal combustion engine, as well as for preserving the quality of the exhaust emissions thereof.

Further, according to a particular aspect of the present invention, these and other objects relating to a method are more particularly and concretely accomplished by a method of either of the sorts described above, or alternatively possessing their combined characteristics, wherein the operational parameters of said diesel internal combustion engine which are the dimensions of said phase space are engine load and engine revolution speed.

According to such a method, the particular parameters of the operation of said diesel internal combustion engine which are most important for deciding whether or not the purging of the soot catcher by restricting the flow of intake air to the diesel internal combustion engine in order to heat up the exhaust gases of said diesel internal combustion engine will be effective and safe are taken into account, in deciding whether or not to perform such intake throttling, and thus the quality of the emissions of the diesel internal combustion engine is preserved, while most advantageously taking advantage of all practicable opportunities for purging said soot catcher.

Further, according to another particular aspect of the present invention, these and other objects relating to a method are more particularly and concretely accomplished by a method of any of the sorts described above, wherein either said first time period, or said second time period, is substantially constant.

According to such a method, the principles of the present invention are simply and yet effectively implemented.

Further, according to yet another particular aspect of the present invention, these and other objects relating to a method are more particularly and concretely accomplished by a method of any of the sorts described above, wherein said second region in said phase space representing intake throttling combinations of engine load and engine revolution speed is defined as the region wherein both engine revolution speed is higher than or equal to a predetermined engine revolution speed value and also engine load is less than or equal to a predetermined engine load value, and said second region in said phase space representing non intake throttling combinations of engineload and engine revolution speed is defined as the regon wherein either engine revolution speed is lower than said predetermined engine revolution speed value or engine load is greater than said predetermined engine load value.

According to such a method, said second region in said phase space representing intake throttling combinations of engine load and engine revolution speed and said first region in said phase space representing non intake throttling combinations of engine load and engine revolution speed are defined simply and yet effectively as regions in said phase space which are respectively a rectangular region and the complement of said rectangular region; and as a matter of course this makes the determination whether said point in said phase space lies in said rectangular second region representing intake throttling combinations of engine load and engine revolution speed or in said first region in said phase space representing non intake throttling combinations of engine load and engine revolution speed easy to perform. Thereby the easy applicability of the method according to the present invention is promoted.

Now, according to the most general apparatus aspect of the present invention, these and other objects are accomplished by, for a diesel internal combustion engine comprisinga soot catcher and an air intake passage which can be selectively throttled so as to purge said soot catcher by the operation of an intake throttling valve which is provided therein: apparatus for selectively providing intake throttling for said diesel internal combustion engine, comprising: a mechanism for selectively positioning said intake throttling valve either to a first position in which said intake throttling valve throttles said intake passage to a relatively large amount or to a second position in which said intake throttling valve throttles said intake passage to a relatively small amount, according to a control signal which said mechanism receives; and a control system for said mechanism for positioning said intake throttling valve, which switches said intake throttling valve between its said second position in which said intake throttling valve throttles said intake passage to a relatively small amount and its said first position in which said intake throttling valve throttles said intake passage to a relatively large amount after a time period has elapsed after the point which represents the current operational condition of said diesel internal combustion engine in a phase space whose dimensions are certain operating parameters of said diesel internal combustion engine has transited between a first region in said phase representing non intake throttling combinations of said certain operating parameters of said diesel internal combustion engine and a second region in said phase space representing intake throttling combinations of said certain operating parameters of said diesel internal combustion engine, said second region being the complement of said first region.

According to such an apparatus, as will be understood from what follows, particular beneficial effects are attained with respect to the purging operation of the soot catcher, and consequently benefits are obtained with regard to quality of the exhaust emissions of the diesel internal combustion engine, and with regard to the drivability thereof.

According to a more particular apparatus aspect of the present invention, those of these objects relating to an apparatus, and others, are accomplished by, for a diesel internal combustion engine comprising a soot catcher and an air intake passage which can be selectively throttled so as to purge said soot catcher by the operation of an intake throttling valve which is provided therein: apparatus for selectively providing intake throttling for said diesel internal combustion engine, comprising: a mechanism for selectively positioning said intake throttling valve either to a first position in which said intake throttling valve throttles said intake passage to a relatively large amount or to a second position in which said intake throttling valve throttles said intake passage to a relatively small amount, according to a control signal which said mechanism receives; and a control system for said mechanism for positioning said intake throttling valve, which positions said intake throttling valve from its said second position in which said intake throttling valve throttles said intake passage to a relatively small amount to its said first position in which said intake throttling valve throttles said intake passage to a relatively large amount after a first time period has elapsed after the point which represents the current operational condition of said diesel internal combustion engine in a phase space whose dimensions are certain operating parameters of said diesel internal combustion engine has transited from a first region in said phase space representing non intake throttling combinations of said certain operating parameters of said diesel internal combustion engine to a second region of said phase space representing intake throttling combinations of said certain operating parameters of said diesel internal combustion engine, said second region being the complement of said first region.

According to such a structure, when said point which represents the current operational condition of said diesel internal combustion engine in said phase space transits from said first region in said phase space representing non intake throttling combinations of said certain operating parameters of said diesel internal combustion engine to said second region in said phase space representing intake throttling combinations of said certain operating parameters of said diesel internal combustion engine, said control system does not immediately control said mechanism for positioning said intake throttling valve so as to cause it to position said intake throttling valve to its position to throttle said air intake passage and thereby to heat up the exhaust gases of said diesel internal combustion engine so as to purge said soot catcher by causing the combustion of soot particles which have accumulated in it, which would be according to the simple minded concept for operation of said intake throttling valve suggested above, but instead a certain time delay equal to said first time period is allowed to lapse, before said throttling action of said intake throttling valve is started by the positioning action of said mechanism for positioning said intake throttling valve, under the control of said control system. Thereby it is avoided that undue smoke and soot should be generated during this first time period after first the aforesaid point has transited from said first region to said second region, of which otherwise there might be a danger. Further, in the event that said point in said phase space wanders to and fro between said first region and said second region quickly and repeatedly, this time delay before deploying the intake throttling effect of said intake throttling valve means that oscillation between the intake throttling position and the non intake throttling position of said intake throttling valve is positively avoided, which is very beneficial for improving the drivability and operability of the diesel internal combustion engine, as well as for preserving the quality of the exhaust emissions thereof.

According to another more particular apparatus aspect of the present invention, those of these objects relating to an apparatus, and others, are accomplished by, for a diesel internal combustion engine comprising a soot catcher and an air intake passage which can be selectively throttled so as to purge said soot catcher by the operation of an intake throttling valve which is provided therein: apparatus for selectively providing intake throttling for said diesel internal combustion engine, comprising: a mechanism for selectively positioning said intake throttling valve either to a first position in which said intake throttling valve throttles and intake passage to a relatively large amount or to a second position in which said intake throttling valve throttles said intake passage to a relatively small amount, according to a control signal which said mechanism receives; and a control system for said mechanism for positioning said intake throttling valve, which positions said intake throttling valve to its said second position in which said intake throttling valve throttles said intake passage to a relatively small amount from its said first position in which said intake throttling valve throttles said intake passage to a relatively large amount after a second time period has elapsed after the point which represents the current operational condition of said diesel internal combustion engine in a phase space whose dimensions are certain operating parameters of said diesel internal combustion engine has transited to a first region in said phase space representing non intake throttling combinations of said certain operating parameters of said diesel internal combustion engine from a second region in said phase space representing intake throttling combinations of said certain operating parameters of said diesel internal combustion engine, said second region being the complement of said first region.

According to such a structure, when said point which represents the current operational condition of said diesel internal combustion engine in said phase space transits from said second region in said phase space representing intake throttling combinations of said certain operating parameters of said diesel internal combustion engine to said first region in said phase space representing non intake throttling combinations of said certain operating parameters of said diesel internal combustion engine, said control system does not immediately control said mechanism for positioning said intake throttling valve so as to cause it to position said intake throttling valve to its position not to throttle said air intake passage and thereby not to heat up the exhaust gases of said diesel internal combustion engine so as not to purge said soot catcher by causing the combustion of soot particles which have accumulated in it, which would be according to the simple minded concept for operation of said intake throttling valve suggested above, but instead a certain time delay equal to said second time period is allowed to lapse, before said throttling action of said intake throttling valve is stopped by the positioning action of said mechanism for positioning said intake throttling valve, under the control of said control system. Thereby, since there is no substantial risk of undue smoke and soot being generated during this second time period after first the aforesaid point has transited from said second region to said first region, even though intake throttling is continued, it is advantageously made possible to utilize this time period for purging of the soot catcher, which improves the efficiency and effectiveness of the purging of the soot catcher. Further, in the event that said point in said phase space wanders to and fro between said first region and said second region quickly and repeatedly, this time delay before ceasing the deployment of the intake throttling effect of said intake throttling valve means that oscillation between the intake throttling position and the non intake throttling position of said intake throttling valve is positively avoided, which is very beneficial for improving the drivability and operability of the diesel internal combustion engine, as well as for preserving the quality of the exhaust emissions thereof.

Further, according to a particular aspect of the present invention, these and other objects relating to an apparatus are more particularly and concretely accomplished by an apparatus of either of the sorts described above, or alternatively possessing their combined characteristics, wherein the operational parameters of said diesel internal combustion engine which are the dimensions of said phase space are engine load and engine revolution speed.

According to such a structure, the control system takes account of just those particular parameters of the operation of said diesel internal combustion engine which are most important for deciding whether or not the purging of the soot catcher by restricting the flow of intake air to the diesel internal combustion engine in order to heat up the exhaust gases of said diesel internal combustion engine will be effective and safe, in deciding whether or not to perform such intake throttling, and thus the quality of the emissions of the diesel internal combustion engine is preserved, while most advantageously taking advantage of all practicable opportunities for purging said soot catcher.

Further, according to another particular aspect of the present invention, these and other objects relating to an apparatus are more particularly and concretely accomplished by an apparatus of any of the sorts described above, wherein either said first time period, or said second time period, is substantially constant.

According to such an apparatus, the principles of the present invention are simply and yet effectively implemented.

Further, according to yet another particular aspect of the present invention, these and other objects relating to an apparatus are more particularly and concretely accomplished by an apparatus of any of the sorts described above, wherein said second region in said phase space representing intake throttling combinations of engine load and engine revolution speed is defined as the region wherein both engine revolution speed is higher than or equal to a predetermined engine revolution speed value and also engine load is less than or equal to a predetermined engine load value, and said second region in said phase space representing non intake throttling combinations of engine load and engine revolution speed is defined as the region wherein either engine revolution speed is lower than said predetermined engine revolution speed value or engine load is greater than said predetermined engine load value.

According to such an apparatus, said second region in said phase space representing intake throttling combinations of engine load and engine revolution speed and said first region in said phase space representing non intake throttling combinations of engine load and engine revolution speed are defined in the operation of said control system simply and yet effectively as regions in said phase space which are respectively a rectangular region and the complement of said rectangular region; and as a matter of course this makes the determination by said control system whether said point in said phase space lies in said rectangular second region representing intake throttling combinations of engine load and engine revolution speed or in said first region in said phase space representing non intake throttling combinations of engine load and engine revolution speed easy to perform. Thereby the easy and cheap construction of the apparatus according to the present invention is promoted.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 2 is a flow chart, showing the operation of a computer program for a control device (which is a microcomputer) incorporated in the above mentioned preferred embodiment of the intake throttling apparatus according to the present invention, for practicing the preferred embodiment of the intake throttling method according to the present invention.

DESCRIPTION OF THE PREFERRED EMBODIMENT

Figure 1:
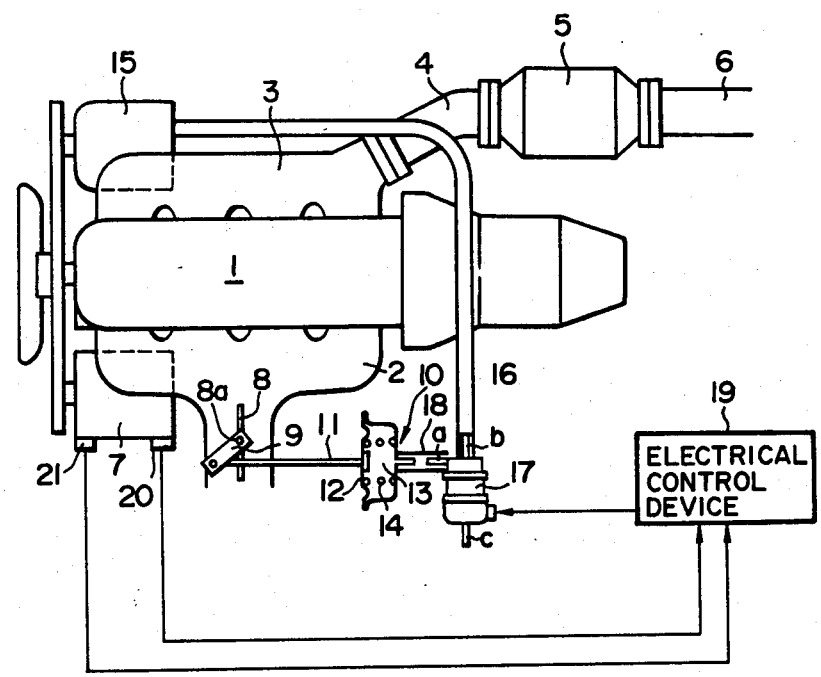
FIG. 1 is a schematic structural view, showing the general structure of a diesel internal combustion engine, incorporating a soot catcher, which is equipped with the preferred embodiment of the intake throttling apparatus according to the present invention, for practicing the preferred embodiment of the intake throttling method according to the present invention.

The present invention will now be described with reference to the preferred embodiment thereof, and with reference to the appended drawings. In FIGS. 1, which is a schematic structural view, the reference numeral 1 generally denotes the diesel internal combustion engine, which is exemplarily a four cylinder in line type diesel internal combustion engine, and which comprises an air intake manifold and passage 2, an exhaust manifold 3, and an exhaust tube 4, which are all per se well known in their structures and functions. The diesel internal combustion engine 1 further has a crankshaft, four cylinders, four pistons sliding reciprocatingly in the cylinders, and four combustion chambers defined above the pistons in the cylinders; none of these elements are shown in the figure. Air is sucked in by the diesel internal combustion engine 1 through the intake manifold and passage 2, into the combustion chambers, and liquid diesel fuel at high pressure is injected into these combustion chambers to be mixed with the thus sucked in air at appropriate timing points by a fuel injection pump 7 which will be described later. After combustion has occurred in the combustion chambers and has powered the pistons and the crankshaft in a per se well known way, the resulting exhaust gases are exhausted from the combustion chambers of the diesel internal combustion engine 1 into the exhaust manifold 3, from which they flow in turn to an exhaust pipe 4 connected to said exhaust manifold 3, which in turn leads to the inlet side of a soot catcher 5, the outlet side of which is connected to a second exhaust pipe 6 which leads to the atmosphere.

The soot catcher 5 is of the above described per se well known sort, which incorporates a filter structure for catching the soot particles present in the exhaust gases passing therethrough; and which is however somewhat prone to becoming clogged up after a long period of service. In more detail, the soot catcher 5 is adapted to catch the combustible solid particles such as carbon particles present in the exhaust gases passing therethrough, while allowing substantially free flow of said exhaust gases therethrough. Such a soot catcher 5 may comprise a filter structure including a multi screen element which is made of ceramic or metal held within a casing of stainless steel or other heat resistant material able to withstand the temperature of the hot exhaust gases passing through the soot catcher 5. It is generally preferable to coat such a multi screen element with a catalyst for catalyzing the combustion of whatever combustible materials may be present in the exhaust gases.

Powering fuel injection to the diesel internal combustion engine 1 is provided from a fuel injection pump 7, which may be a per se well known Bosch type VE fuel injection and distribution pump, and which typically comprises a drive shaft which is rotated via a driving belt and a pulley by the crankshaft (not shown) of the diesel internal combustion engine 1 and which is maintained in a predetermined definite rotational phase relationship with respect to said crankshaft, and a fuel metering and distribution device which supplies metered powering pulses of diesel fuel at high pressure at correct timing points to the four combustion chambers. The amount of each of these powering pulses of injected diesel fuel is determined by said fuel metering and distribution device in such a way that it increases according to increase in the load on the diesel internal combustion engine 1, and in more detail is determined in relation to the movement of a control element which is moved by a linkage, not shown in the drawing, which connects said linkage to an accelerator pedal of the vehicle (also not shown in the drawing) in a per se well known way. Also, possibly, the fuel metering and distribution device may be moved in relation to the action of a governor of a per se well known sort, which may be incorporated in the fuel injection pump 7. Thus the amount of fuel injected to each of the combustion chambers, in each powering pulse, may be controlled according to the amount of depression of said accelerator pedal, and also according to the speed of rotation of the drive shaft of said main fuel injection pump 7, and increases with increase in engine load. To the fuel injection pump 7 there are attached an engine load sensor 20 and an engine revolution speed sensor 21, and these sensors provide electrical output signals representative respectively of the current values of vehicle engine load and crankshaft revolution speed of the diesel internal combustion engine 1. No particular structures are shown in the figure or further discussed here for the engine load sensor 20 and the engine revolution speed sensor 21, for producing these electrical output signals, because such means are per se well known and conventional in various different forms.

In the intake manifold and air intake passage 2 there is provided an intake throttling butterfly valve, which is designated by the reference numeral 8 in the figure, and which is located at an intermediate point of said air intake passage 2. This butterfly valve 8 is pivoted within the air intake passage 6 about a rotational axis 8a, and is rotationally coupled to one end of a drive lever 9. The left hand end in the figure of an actuating rod 11 is coupled to the free end of this drive lever 9, and the right hand end in the figure of this actuating rod 11 is drivingly connected to the diaphragm 12 of a diaphragm actuator 10 for the butterfly valve 8. A diaphragm chamber 13 is defined within the diaphragm actuator 10, to the right of the diaphragm 12 in the figure, and this diaphragm chamber 13 is provided via a vacuum conduit 18 with the vacuum present at a first port designated as "a" of an electrically actuated two way switching valve 17, which will be described in detail hereinafter. In the diaphragm chamber 13 there is provided a compression coil spring 14, which biases said diaphragm 12 and said actuating rod 11 to the left in the figure so as to bias the butterfly valve 8 in the clockwise direction as seen in the figure against a stop member, not shown, which prevents said butterfly valve 8 moving in the clockwise direction past its position as seen in the figure, i.e. the position of said butterfly valve 8 in which it provides minimum resistance to flow of intake air in the intake manifold and air intake passage 2. Thus, the greater is the value of the depression below the current value of atmospheric pressure of the vacuum present within the vacuum conduit 18 and within the diaphragm chamber 13, the more is the diaphragm 12 moved to the right from the point of view of the figure against the biasing action of the compression coil spring 14 which is overcome, the more is the butterfly valve 8 rotated in the counterclockwise direction as seen in the figure, and the greater is the choking resistance which said butterfly valve 8 provides to flow of intake air of the diesel internal combustion engine 1 through the intake manifold and air intake passage 2; and, vice versa, the less is the vacuum present within the vacuum conduit 18 and within the diaphragm chamber 13, the more is the diaphragm 12 moved to the left from the point of view of the figure under the biasing action of the compression coil spring 14, the more is the butterfly valve 8 rotated in the clockwise direction as seen in the figure, and the lesser is the choking resistance which said butterfly valve 8 provides to flow of intake air of the diesel internal combustion engine 1 through the intake manifold and air intake passage 2.

A vacuum pump 15 is provided to said diesel internal combustion engine 1 and is driven from the crankshaft thereof, in fact in the shown preferred embodiment by the same belt as is used for driving the fuel injection pump 7, although of course this is not essential to the present invention, so that the vacuum pump 15 is arranged to generate a continuous supply of vacuum whenever the diesel internal combustion engine 1 is running. This vacuum pump 15 generates a supply of substantially constant vacuum of a fairly high vacuum value, i.e. fairly much depressed below the current value of atmospheric pressure. This vacuum thus generated by this vacuum pump 15 is fed via a vacuum conduit 16 to a second port designated as "b" of the aforementioned electrically actuated two way switching valve 17. The third port of this electrically actuated two way switching valve 17, designated as "c", is communicated (possibly via an air filter) to the atmosphere, and is thus always supplied with air at substantially atmospheric pressure.

This electrically actuated two way switching valve 17 is of a per se well known type, and includes (for example) a solenoid, and has the aforementioned three ports, designated as "a", "b", and "c" in the figure. When said solenoid is not supplied with actuating electrical energy, the ports "a" and "c" of the electrically actuated two way switching valve 17 are communicated together while the port "b" is not communicated to any other port of said electrically actuated two way switching valve 17; but, on the other hand, when said solenoid is supplied with actuating electrical energy, the ports "a" and "b" are communicated together while the port "c" is not communicated to any other port of said electrically actuated two way switching valve 17. This solenoid of the electrically actuated two way switching valve 17 is selectively supplied with actuating electrical energy by an electrical control device 19 which will be described shortly with regard to its function.

Thus, as will be readily understood, provided that the electrically actuated two way switching valve 17 is not supplied with actuating electrical energy by the electrical control device 19, then its two ports "a" and "c" are kept communicated together while its port "b" is not communicated to any other port, and thus atmospheric pressure is transmitted directly through said electrically actuated two way switching valve 17 to the diaphragm chamber 13 of the diaphragm actuator device 10 without being affected by said electrically actuated two way switching valve 17, thus causing said diaphragm actuator device 10 to be in the fully relaxed position, with its diaphragm 12 fully displaced in the leftwards direction as seen in the figure by the compression action of the compression coil spring 14, thus turning the intake throttling butterfly valve 8, via the actuating rod 11 and the drive lever 9, to its fully clockwise displaced position as seen in the figure, so as to ensure that minimum intake throttling is being provided for the diesel internal combustion engine 1. On the other hand, when the electrically actuated two way switching valve 17 is supplied with actuating electrical energy by the electrical control device 19, then its two ports "a" and "b" are communicated together while the port "c" is not communicated to any other port, and thus the aforementioned vacuum outputted from the vacuum pump 15 and present in the vacuum conduit 16 is transmitted directly through said electrically actuated two way switching valve 17 to the diaphragm chamber 13 of the diaphragm actuator device 10 without being affected by said electrically actuated two way switching valve 17, thus causing said diaphragm actuator device 10 to be in the fully operational position, with its diaphragm 12 fully displaced in the rightwards direction as seen in the figure by the suction action of the aforesaid vacuum in the diaphragm chamber 13 against the compression action of the compression coil spring 14 which is overcome, thus turning the intake throttling butterfly valve 8, via the actuating rod 11 and the drive lever 9, to its fully anticlockwise displaced position as seen in the figure, so as to ensure that maximum intake throttling is being provided for the diesel internal combustion engine 1.

As stated earlier, the appropriate supply of actuating electrical energy to the electrically actuated two way switching valve 17, i.e. the supply of a steady electrical signal whose value is appropriately either high or low (that is, is either ON or OFF) to the electrically actuated two way switching valve 17, is made by the electrical control device 19, based upon certain input signals which it receives. In the described and shown preferred embodiment of the diesel intake throttling method and apparatus according to the present invention this electrical control device 19 inputs the aforesaid electrical signal from the engine load sensor 20 which senses the load on the diesel internal combustion engine 1 and which outputs an electrical signal indicative of said engine load, and the aforesaid electrical signal from the engine revolution speed sensor 21 which senses the revolution speed of the crankshaft of the diesel internal combustion engine 1 and which outputs an electrical signal indicative of said engine load. No particular structure will be described for this electrical control device 19, because, based upon the description of the function thereof given herein, and based upon various forms of prior art diesel intake throttling valve control systems, various possible structures for such an electrical control device 19 can easily be conceived of by one of ordinary skill in the relevant art. For example, the electrical control device 19 might (in fact, in the preferred embodiment, it does) comprise a microcomputer with various programs stored in the memory thereof, and might further comprise various analog to digital and digital to analog converters of per se well known sorts which interface between the above described sensors and said microcomputer, and between said microcomputer and said electrically actuated two way switching valve 17; and the details of the control programs for such a microcomputer will be easily conceived of by one of ordinary skill in the microprogramming art, based upon the functional disclosure relating to the overall control function of the electrical control device 19 contained in this specification. Alternatively, the electrical control device 19 might comprise various specialized electronic circuits for performing the functions explained herein and quite possibly other functions which are per se well known; and, again, the details of such specialized electronic circuits will be easily conceived of by one of ordinary skill in the art, based upon the functional disclosures in this specification.

In any case, the electrical control device 19 operates as follows, as it is comprised in the functioning of the shown preferred embodiment of the intake throttling method according to the present invention.

When in some way, which itself may be well known, and which will not be particularly described here, it is determined by the control device 19 that the soot catcher 5 is in need of purging—this purging decision may be made according as to whether or not the crankshaft (not shown) of the diesel internal combustion engine 1 has performed a given (rather large) number of revolutions since the last time that the soot catcher 5 was purged, or alternatively this decision may be based upon the current value of the pressure in the exhaust pipe 4 upstream of the soot catcher 5, as measured by an appropriate sensor (also not shown), or alternatively also other possible types of decision criterion might be envisaged—then a decision is made as to whether either both the revolution speed of the crankshaft of the diesel internal combustion engine 1, as sensed by the engine revolution speed sensor 21 and as transmitted therefrom to the electrical control device 19, is greater than a predetermined value Na which may for example be 2000 revolutions per minute, and also the load on the diesel internal combustion engine 1, as sensed by the engine load sensor 20 and as transmitted therefrom to the electrical control device 19, is less than a predetermined value Ra which may for example by 30%, or alternatively either or both of these parameters lies outside these ranges. In other words, a decision is made by the electrical control device 19 as to whether or not, in the phase space whose dimensions are engine load and engine revolution speed, the point representing the current operational condition of the diesel internal combustion engine 1 lies inside a second region which is shaped as a rectangle and which is defined as containing all those points whose engine load value is less than 30% and whose revolution speed value is also greater than 2000 revolutions per minute, or lies inside a first region which is the complement of said second region. This first region is the region for not performing throttling of the intake manifold and passage 2 by the intake throttling butterfly valve 8, and this second region is the region for performing throttling of the intake manifold and passage 2 by the intake throttling butterfly valve 8.

Now, in the case that the result of this determination is that said point in the phase space in fact lies in said second region, in other words, in the case that the current instant by instant values of the operating parameters of the diesel internal combustion engine 1 at this time are appropriate for performing throttling of the intake manifold and passage 2 by the intake throttling butterfly valve 8, in order to heat up the exhaust gases of the diesel internal combustion engine 1 and thereby to purge the soot catcher 5, then according to one aspect of the present invention the electrical control device 19 determines whether said point has been in said second region for more than a certain predetermined time period, in other words, whether the instant by instant values of the operating parameters of the diesel internal combustion engine 1 have been appropriate for performing throttling of the intake manifold and passage 2 by the intake throttling butterfly valve 8, in order to heat up the exhaust gases of the diesel internal combustion engine 1 and thereby to purge the soot catcher 5, for at least said certain predetermined time period. If so, then the electrical control device 19 outputs an ON signal, i.e. a voltage high signal which causes, as explained above, the two ports "a" and "b" of the electrically actuated two way switching valve 17 to be communicated together while the port "c" is not communicated to any other port, and thus the vacuum outputted from the vacuum pump 15 and present in the vacuum conduit 16 is passed through the electrically actuated two way switching valve 17 without dilution and is transmitted to the diaphragm chamber 13 of the diaphragm actuator device 10. Thus said diaphragm actuator device 10 is caused to be in the fully operational position, thus providing the maximum amount of clockwise motion of the butterfly valve 8, and thus providing the maximum amount of choking of the intake passage 2 by said butterfly valve 8, whereby the exhaust gases of the diesel internal combustion engine 1 are heated up, thus initiating purging of the soot cather 5, if in fact such purging was not already in progress.

On the other hand, in the case that the result of this determination is that said point in the phase space in fact lies in said first region, in other words, in the case that the current instant by instant values of the operating parameters of the diesel internal combustion engine 1 at this time are not appropriate for performing throttling of the intake manifold and passage 2 by the intake throttling butterfly valve 8, in order to heat up the exhaust gases of the diesel internal combustion engine 1 and thereby to purge the soot catcher 5, then according to another aspect of the present invention the electrical control device 19 determines whether said point has been in said first region for more than another certain predetermined time period, in other words, whether the instant by instant values of the operating parameters of the diesel internal combustion engine 1 have been inappropriate for performing throttling of the intake manifold and passage 2 by the intake throttling butterfly valve 8, in order to heat up the exhaust gases of the diesel internal combustion engine 1 and thereby to purge the soot catcher 5, for at least said certain other predetermined time period. If so, then the electrical control device 19 outputs an OFF signal, i.e. a voltage low signal which causes, as explained above, the two ports "a" and "c" of the electrically actuated two way switching valve 17 to be communicated together while the port "b" is not communicated to any other port, and thus the vacuum outputted from the vacuum pump 15 and present in the vacuum conduit 16 is not passed through the electrically actuated two way switching valve 17, but instead air at substantially atmospheric pressure is transmitted to the diaphragm chamber 13 of the diaphragm actuator device 10. Thus said diaphragm actuator device 10 is caused to be in the fully relaxed position, thus providing the minimum amount of clockwise motion of the butterfly valve 8, and thus providing the minimum amount of choking of the intake passage 2 by said butterfly valve 8, whereby the exhaust gases of the diesel internal combustion engine 1 are not substantially heated up thus ceasing purging of the soot catcher 5, if in fact such purging was previously in progress.

Now the more detailed operation of the intake throttling apparatus shown in FIG. 1, which is the preferred embodiment of the method according to the present invention, will be described, with reference to the flow chart shown in FIG. 2. In fact, the control device 19 in the shown preferred embodiment of the intake throttling method according to the present invention is a microcomputer which executes a program based upon this flow chart, possibly also performing other regulatory tasks for the diesel internal combustion engine 1 and/or the vehicle incorporating it. The control device 19 continuously receives an electrical signal from the engine load sensor 20 attached to the fuel injection pump 7 representative of engine load and also continuously receives an electrical signal from the engine revolution speed sensor 21 also attached to the fuel injection pump 7 representative of engine rotational speed, as schematically indicated by directed signal lines in FIG. 1. The control device 19, thus, receives signals representative of engine load and engine revolution speed, and possibly other signals representative of other engine operational parameters, and produces an output signal for controlling the operation of the two way electromagnetic vacuum switching valve 17. The algorithm according to which this is done, and the results thereof, will now be explained, referring to FIG. 2. It should be understood that the algorithm illustrated by the flow chart of FIG. 2 is executed repeatedly by the control device 19, for example at intervals of about one second, whenever the diesel internal combustion engine 1 is operating. Of course, between repeated executions of this algorithm, the control device 19 may well, and typically will, perform various other computational and/or regulatory tasks for the diesel internal combustion engine 1, of various other sorts. The details of these concurrent tasks will not be allowed to detain us here.

First, when this algorithm is started to be execcuted, from the START block the flow of control passes to the PURGING TIME? decision block.

In the PURGING TIME? decision block, a decision is made as to whether it is currently time to purge the soot catcher 5. The criterion for this purging decision may be whether or not the crankshaft (not shown) of the diesel internal combustion engine 1 has performed a given (rather large) number of revolutions since the last time that the soot catcher 5 was purged; or alternatively this criterion may be based upon the current value of the pressure in the exhaust pipe 4 upstream of the soot catcher 5, as measured by an appropriate sensor (also not shown). Also, other possible types of such criterion might be envisaged. In any case, this PURGING TIME? decision block serves to decide whether the present time point is an appropriate time point for purging the soot catcher 5, i.e. if it is likely that at this present time point the soot catcher 5 is choked up with soot particles to a sufficient amount to require purging. If the result of the decision in this PURGING TIME? decision block is NO, i.e. if there is no need to purge the soot catcher 5 at this time, then the flow of control passes to enter next the RESET block, and otherwise if the result of the decision in this PURGING TIME? decision block is YES, i.e. if the soot catcher 5 needs at this time to be purged, then the flow of control passes to enter next the IS N GREATER THAN OR EQUAL TO Na? decision block.

In the NO branch from this PURGING TIME? decision block, since it is decided at this point that there is no need to purge the soot catcher 5 at this time, therefore at this point no particular action needs to be taken by the control device 19. Therefore, the flow of control passes to enter next the RESET block. In this RESET block, the control device 19 returns, so as again to start the algorithm shown in FIG. 2 after an appropriate time period, which as mentioned above can be exemplarily about one second.

On the other hand, in the YES branch from this PURGING TIME? decision block, since it is decided at this point that it is likely that at this present time point the soot catcher 5 is choked up with soot particles to a sufficient amount to require puring, therefore at this point it should now be decided as to whether purging is actually practicable or not. Therefore, the flow of control passes to enter next the IS N GREATER THAN OR EQUAL TO Na? decision block.

In this IS N GREATER THAN OR EQUAL TO Na? decision block, a decision is made as to whether the current revolution speed of the diesel internal combustion engine 1, denoted by "N", as determined by the control device 19 based upon the electrical signal from the engine revolution speed sensor 21, is greater than or equal to a certain predetermined value Na, which exemplarily may be taken as 2000 revolutions per minute, or not. Thus, this IS N GREATER THAN OR EQUAL TO Na? decision block serves to decide whether or not the current value of the revolution speed of the diesel internal combustion engine 1 is sufficiently high for intake throttling to be performed in order to purge the soot catcher 5, or not. In fact, if the revolution speed of the diesel internal combustion engine 1 is lower than some predetermined value, i.e. exemplarily the value of 2000 revolutions per minute, then throttling of the intake manifold and passage 2 by the throttle butterfly valve 8 will not in any case be sufficiently effective for heating up the exhaust gases of the diesel internal combustion engine 1 in order to purge the soot catcher 5. If the result of the decision in this IS N GREATER THAN OR EQUAL TO Na? decision block is NO, i.e. if the current value of the revolution speed of the diesel internal combustion engine 1 is below the predetermined value Na and thus is not sufficiently high at this time for intake throttling to be performed in order to purge the soot catcher 5, then the flow of control passes to enter next the first IS F EQUAL TO ONE? decision block, and otherwise if the result of the decision in this IS N GREATER THAN OR EQUAL TO Na? decision block is YES, i.e. if the current value of the revolution speed "N" of the diesel internal combustion engine 1 is higher than or equal to the predetermined value Na and thus is sufficiently high at this time for intake throttling to be performed in order to purge the soot catcher 5, then the flow of control passes to enter next the IS R LESS THAN OR EQUAL TO Ra? decision block.

Thus, in this YES branch from this IS N GREATER THAN OR EQUAL TO Na? decision block, since it is decided at this point that the current value of the revolution speed of the diesel internal combustion engine 1 is above the predetermined value Na and thus is sufficiently high at this time for intake throttling to be performed in order to purge the soot catcher 5, and also at this current time point it would be desirable to regenerate the soot catcher 5 if possible, therefore at this point the current value of the load on the diesel internal combustion engine 1 should be tested to see if it also is currently falling in a suitable range for purging the soot catcher 5. Therefore, the flow of control passes to enter next the IS R LESS THAN OR EQUAL TO Ra? decision block.

In this IS R LESS THAN OR EQUAL TO Ra? decision block, a decision is made as to whether the current load, designated by "R", on the diesel internal combustion engine 1, as determined by the control device 19 based upon the electrical signal from the engine load sensor 20, is less than or equal to a certain predetermined value Ra, which exemplarily may be taken as 30 percent. Thus, this IS R LESS THAN OR EQUAL TO Ra? decision block serves to decide whether or not the current value of the revolution speed of the diesel internal combustion engine 1 is sufficiently low for intake throttling to be performed in order to purge the soot catcher 5, or not. In fact, if the current load "R" on the diesel internal combustion engine 1 is higher than some predetermined value, i.e. exemplarily the value of 30 percent, then throttling of the intake manifold and passage 2 by the throttle butterfly valve 8 for heating up the exhaust gases of the diesel internal combustion engine 1 in order to purge the soot catcher 5 is very undesirable. If the result of the decision in this IS R LESS THAN OR EQUAL TO Ra? decision block is NO, i.e. if the current value of the load "R" on the diesel internal combustion engine 1 is above the predetermined value Ra and thus is not sufficiently low at this time for intake throttling to be safely performed in order to purge the soot catcher 5, then the flow of control passes to enter next the first IS F EQUAL TO ONE? decision block, and otherwise if the result of the decision in this IS R LESS THAN OR EQUAL TO Ra? decision block is YES, i.e. if the current value of the load "R" on the diesel internal combustion engine 1 is less than or equal to the predetermined value Ra and thus is sufficiently low at this time for intake throttling to be performed in order to purge the soot catcher 5, then the flow of control passes to enter next the second IS F EQUAL TO ONE? decision block.

Thus when the flow of control enters this second IS F EQUAL TO ONE? decision block, i.e. when the result of the decision in the IS R LESS THAN OR EQUAL TO Ra? decision block is YES, it has been decided at this point that the current value of the revolution speed N of the diesel internal combustion engine 1 is above the predetermined value Na and thus is sufficiently high at this time for intake throttling to be performed in order to purge the soot catcher 5, and that the current value of the load "R" on the diesel internal combustion engine 1 is below the predetermined value Ra and thus is sufficiently low at this time for intake throttling to be performed in order to purge the soot catcher 5, and also that at this current time point it would be desirable to regenerate the soot catcher 5 if it is not already in fact being regenerated. Therefore at this point consideration must be given to starting the throttling of the intake manifold and passage 2 by the intake throttling valve 8, if such throttling is in fact not yet currently being performed. Therefore, this test is made by this second IS F EQUAL TO ONE? decision block.

A flag F is maintained by the control program whose agorithm is given in FIG. 2, to show whether or not in fact at the current time the intake butterfly valve 8 is being closed, i.e. is being rotated in the counterclockwise direction in FIG. 1, in order to perform intake throttling for the diesel internal combustion engine 1 and in order thus to purge the soot catcher 5; in fact, in the shown implementation (although of course it is actually quite arbitrary), a value of F equal to 1 is used to mean that intake throttling is currently being performed and thus that the soot catcher 5 is currently being purged, and a value of F equal to 0 is used to mean that intake throttling is not currently being performed and thus that the soot catcher 5 is not currently being purged.

Thus, this second IS F EQUAL TO ONE? decision block serves for testing whether or not intake throttling is currently being performed, or not. If the result of the decision in this second IS F EQUAL TO ONE? decision block is NO, i.e. if in fact at the current time the intake butterfly valve 8 is not in the state of being closed, i.e. of being rotated in the counterclockwise direction in FIG. 1, in order to perform intake throttling for the diesel internal combustion engine 1 and in order thus to purge the soot catcher 5, then the question of starting this closing of the intake butterfly valve 8 and of starting throttling of the intake passage 2 of the diesel internal combustion engine 1 arises, and thus the flow of control passes to enter next the SET $C_1$ TO $C_1$ PLUS ONE block, which will be explained later, and otherwise if the result of the decision in this second IS F EQUAL TO ONE? decision block is YES, i.e. if in fact at the current time the intake butterfly valve 8 is in the state of being closed, i.e. of being rotated in the counterclockwise direction in FIG. 1, in order to perform intake throttling for the diesel internal combustion engine 1 and in order thus to purge the soot catcher 5, then the flow of control passes to enter next the IS PURGING COMPLETED? decision block.

Thus, in this YES branch from this second IS F EQUAL TO ONE? decision block, since it is decided at this point that currently purging of the soot catcher 5 is being performed, therefore at this point it is proper to decide whether this purging of the soot catcher 5 is completed, or not. Thus, the flow of control passes to enter next the IS PURGING COMPLETED? decision block.

In this IS PURGING COMPLETED? decision block, a decision is made as to whether the purging process for the soot catcher 5 has in fact been completed, or not. Thus, this IS PURGING COMPLETED? decision block serves to decide whether soot catcher purging should be switched off, or not. If the result of the decision in this IS PURGING COMPLETED? decision block is NO, i.e. if the soot catcher 5 has not yet been sufficiently purged, then the flow of control is passed directly to the RESET block, and otherwise if the result of the decision in this IS PURGING COMPLETED? decision block is YES, i.e. if the soot catcher 5 has by now been sufficiently purged, then the flow of control passes to enter next the SET F TO ZERO AND CEASE INTAKE THROTTLING BY VALVE 8 block. Now, the particular details of the way in which the decision in this IS PURGING COMPLETED? decision block is arrived at will not be particularly given here: in fact, of course, they will parallel the details of the way in which the decision in the PURGING TIME? decision block, in which the decision was made as to whether it was currently time to purge the soot catcher 5, were performed. Thus, again, the criterion for this end of purging decision may be whether or not the crankshaft (not shown) of the diesel internal combustion engine 1 has performed a given number of revolutions since the time that the soot catcher 5 started to be purged; or alternatively this criterion may be based upon the current value of the pressure in the exhaust pipe 4 upstream of the soot catcher 5, as measured by an appropriate sensor (not particularly shown). Also, other possible types of such criterion might be envisaged.

Thus, in this YES branch from this IS PURGING COMPLETED? decision block, since it is decided at this point that the purging process for the soot catcher 5 has been performed for a sufficiently great amount of time and has been successful, therefore at this point purging for the soot catcher 5 should be terminated. Therefore, the flow of control passes to enter next the SET F TO ZERO AND CEASE INTAKE THROTTLING BY VALVE 8 block.

In this SET F TO ZERO AND CEASE INTAKE THROTTLING BY VALVE 8 block, the valve of the flag F is set to zero, in order to indicate that intake throttling is no longer currently being performed and thus that the soot catcher 5 is no longer currently being purged, and also a voltage low signal is sent by the control device 19 (via appropriate digital to analog converters or the like, which are not shown) to the electrically actuated tow way switching valve 17, thus causing the ports "a" and "c" of said electrically actuated two way switching valve 17 to be communicated together while the port "b" is not communicated to any other port, and thus causing air at atmospheric pressure to be supplied via the vacuum conduit 18 to the diaphragm chamber 13 of the diaphragm actuator device 10, thus causing the diaphragm 12 thereof and the actuating rod 11 to be shifted to their leftwards positions as seen in the figure, thus rotating the intake butterfly valve 8 in the clockwise direction to its maximum extent as seen in the figure and thus causing intake throttling for the intake manifold and passage 2 of the diesel internal combustion engine 1 to be reduced to its minimum amount, thus ceasing the heating up of the exhaust gases of said diesel internal combustion engine 1 and thus ceasing the consequent purging of the soot catcher 5. By the way, this low voltage value electrical signal to the electrically actuated two way switching valve 17 is maintained by some device such as for example a flip flop or the like, incorporated in the control device 19 but not shown, so as to keep said electrically actuated two way switching valve 17 in its state as mentioned above wherein its port "a" is communicated to its port "c" and its port "b" is not communicated to any other port, until the block which alters said low value electrical signal to said electrically actuated two way switching valve 17 in the algorithm for the operation of the control device 19 whose flow chart is shown in FIG. 2 is obeyed, i.e. until the block SET F TO ONE AND $C_1$ TO ZERO AND COMMENCE INTAKE THROTTLING BY VALVE 8 is obeyed (the function of this block will be described later in detail). From this SET F TO ZERO AND CEASE INTAKE THROTTLING BY VALVE 8 block, the flow of control passes to enter next the RESET block.

On the other hand, in the NO branch from this IS PURGING COMPLETED? decision block, since it is decided at this point that purging of the soot catcher 5 should continue, therefore at this point no particular action needs to be taken. Therefore, the flow of control passes directly to the RESET block, as stated above.

Now, to come back in this description to the NO branch from this second IS F EQUAL TO ONE? decision block, since it is decided at this point that in fact at the current time the intake butterfly valve 8 is not in the state of being closed, i.e. of being rotated in the counterclockwise direction in FIG. 1, in order to perform intake throttling for the diesel internal combustion engine 1 and in order thus to purge the soot catcher 5, then the question of starting this closing of the intake butterfly valve 8 and of starting throttling of the intake passage 2 of the diesel internal combustion engine 1 arises. According to the principles of the present invention, as explained above, a certain time delay of the order perhaps of a few tens of seconds should be allowed to elapse from the time that first the engine revolution speed N and the engine load R as indicated respectively by the engine revolution speed sensor 21 and the engine load sensor 20 transit from their ranges in which it is not appropriate for throttling of the intake passage 2 of the diesel internal combustion engine 1 in order to cause purging of the soot catcher 5 to be performed to their ranges in which it is appropriate for throttling of the intake passage 2 of the diesel internal combustion engine 1 in order to cause purging of the soot catcher 5 to be performed, before actual commencement of such intake throttling; in other words, the intake butterfly valve 8 should not be immediately moved to its position to throttle the intake passage 2 of the diesel internal combustion engine as soon as the circumstances for purging of the soot catcher 5, as defined only in terms of the instantaneous current values of the engine revolution speed N and the engine load R, are appropriate therefor, but instead the aforesaid time delay of the order of a few tens of seconds should be allowed to elapse first. Thus, a time counting system is established to measure this appropriate time delay, in the operation of the algorithm for the control device 19 whose flow chart is shown in FIG. 2, and this is performed by the use of a first time counter $C_1$, whose value is maintained at zero except during the elapsing of the aforesaid time delay, as will be seen hereinafter, and which is used for counting the number of iterations round the cycle of the program whose flow chart is shown in FIG. 2 that have been performed, while waiting to initiate intake throttling.

Thus the flow of control passes from the NO branch of the second IS F EQUAL TO ONE? decision block to enter next the SET $C_1$ TO $C_1$ PLUS ONE block. In this SET $C_1$ TO $C_1$ PLUS ONE block, the value of the above explained first counter $C_1$ is increased by one. If the program the flow chart of whose algorithm is shown in FIG. 2 is executed about once every second, as is typical as explained above, thereby the value in the first counter $C_1$ is therefore approximately equal to the waiting time in seconds since first it was decided that purging of the soot catcher 5 was appropriate, i.e. is approximately equal to the time in seconds since first the engine revolution speed N and the engine load R as indicated respectively by the engine revolution speed sensor 21 and the engine load sensor 20 transit from their ranges in which it is not appropriate for throttling of the intake passage 2 of the diesel internal combustion engine 1 in order to cause purging of the soot catcher 5 to be performed to their ranges in which it is appropriate for throttling of the intake passage 2 of the diesel internal combustion engine 1 in order to cause purging of the soot catcher 5 to be performed; since the value of the first counter $C_1$ is kept at zero except during this waiting time, as will be apparent from what follows. After this count, from this SET $C_1$ TO $C_1$ PLUS ONE block, the flow of control passes to enter next the IS $C_1$ EQUAL TO $C_a$? decision block.

In this IS $C_1$ EQUAL TO $C_a$? decision block, a decision is made as to whether or not the value of the first counter $C_1$ has yet reached a trigger value of $C_a$, which exemplarily may be equal to about ten to thirty or so. Thus, this IS $C_1$ EQUAL TO $C_a$? decision block serves to decide whether or not the aforesaid appropriate time period has elapsed from the time point at which first it was decided that purging of soot catcher 5 was appropriate, i.e. is approximately equal to the time in seconds since first the engine revolution speed N and the engine load R as indicated respectively by the engine revolution speed sensor 21 and the engine load sensor 20 transit from their ranges in which it is not appropriate for throttling of the intake passage 2 of the diesel internal combustion engine 1 in order to cause purging of the soot catcher 5 to be performed to their ranges in which it is appropriate for throttling of the intake passage 2 of the diesel internal combustion engine 1 in order to cause purging of the soot catcher 5 to be performed. If the result of the decision in this IS $C_1$ EQUAL TO $C_a$? decision block is NO, i.e. if this time period has not yet elapsed and thus it is not yet appropriate actually to initiate throttling of the intake manifold 2 of the diesel internal combustion engine 1 in order to heat up the exhaust gases thereof in order to start purging the soot catcher 5, then more time should be allowed to elapse, and accordingly the flow of control passes directly to the RESET block, thus terminating this iteration of the program for the control device 19 whose flow chart is shown in FIG. 2; and otherwise if the result of the decision in this IS $C_1$ EQUAL TO $C_a$? decision block is YES, i.e. if at the present moment the appropriate time period has just now elapsed and thus it now for the first time has become appropriate actually to initiate throttling of the intake manifold 2 of the diesel internal combustion engine 1 in order to heat up the exhaust gases thereof in order to start purging the soot catcher 5, then no more time should be allowed to elapse, then the flow of control passes to enter next the SET F TO ONE AND $C_1$ TO ZERO AND COMMENCE INTAKE THROTTLING BY VALVE 8 block.

In this SET F TO ONE AND $C_1$ TO ZERO AND COMMENCE INTAKE THROTTLING BY VALVE 8 block, the value of the flag F is set to one, in order to indicate that intake throttling is now currently being performed and thus that the soot catcher 5 is now currently being purged, and the value of the first counter $C_1$ is also reset to zero, and also a voltage high signal is sent by the control device 19 (via appropriate digital to analog converters or the like, as mentioned before, which are not shown) to the electrically actuated two way switching valve 17, thus causing the ports "a" and "b" of said electrically actuated two way switching valve 17 to be communicated together while the port "c" is not communicated to any other port, and thus causing vacuum from the vacuum pump 15 to be supplied via the vacuum conduit 16 and the vacuum conduit 18 to the diaphragm chamber 13 of the diaphragm actuator device 10, thus causing the diaphragm 12 thereof and the actuating rod 11 to be shifted to their rightwards positions from the point of view of the figure, this rotating the intake butterfly valve 8 in the counterclockwise direction to its maximum extent from the point of view of the figure and thus causing intake throttling for the intake manifold and passage 2 of the diesel internal combustion engine 1 to be performed to its maximum amount, thus causing the commencement of the heating up of the exhaust gases of said diesel internal combustion engine 1 and thus causing the commencement of the consequent purging of the soot catcher 5. In a similar fashion to the previously described case of the low voltage value electrical signal to the electrically actuated two way switching valve 17, this high voltage value electrical signal is maintained by some device such as for example the flip flop or the like, previously mentioned, incorporated in the control device 19 but not shown, so as to keep said electrically actuated two way switching valve 17 in its state as mentioned above wherein its port "a" is communicated to its port "b" and its port "c" is not communicated to any other port, until a block which alters said high value electrical signal to said electrically actuated two way switching valve 17 in the algorithm for the operation of the control device 19 whose flow chart is shown in FIG. 2 is obeyed, i.e. until either the block SET F TO ZERO AND CEASE INTAKE THROTTLING BY VALVE 8 (the function of this block has been described earlier in detail) or the block SET F TO ZERO AND $C_2$ TO ZERO AND CEASE INTAKE THROTTLING BY VALVE 8 (the function of this block will be described later in detail) is obeyed. From this SET F TO ONE AND $C_1$ TO ZERO AND COMMENCE INTAKE THROTTLING BY VALVE 8 block, the flow of control passes to enter next the RESET block, thus terminating this iteration of the program for the control device 19 whose flow chart is shown in FIG. 2.

On the other hand, now to consider the case in which control passes along the NO branch from the IS N GREATER THAN OR EQUAL TO Na? decision block, and also the case in which control passes along the NO branch from the IS R LESS THAN OR EQUAL TO Ra? decision block, since it is decided at this point that the current value of the revolution speed N of the diesel internal combustion engine 1 is below the predetermined value Na and thus is not sufficiently high at this time for intake throttling to be performed in order to purge the soot catcher 5, or alternatively it has been decided that the current value of the load R on the diesel internal combustion engine 1 is above the predetermined value Ra and thus is not sufficiently low at this time for intake throttling to be performed in order to purge the soot catcher 5, and although at this current time point the condition prevails that it would be desirable to regenerate the soot catcher 5 if possible or (in the case that such regeneration is already going on) to continue regeneration thereof if possible, since it is not possible indefinitely to continue such regeneration at this time or to start such regeneration if it has not yet been started, therefore at this point consideration must be given to stopping the throttling of the intake manifold and passage 2 by the intake throttling valve 8, if such throttling is in fact currently being performed. Therefore, this test is made by this first IS F EQUAL TO ONE? decision block. Thus, this first IS F EQUAL TO ONE? decision block serves for testing whether or not intake throttling is currently being performed, or not. If the result of the decision in this first IS F EQUAL TO ONE? decision block is YES, i.e. if in fact at the current time the intake butterfly valve 8 is in the state of being closed, i.e. of being rotated in the clockwise direction as seen in FIG. 1 in order to perform intake throttling for the diesel internal combustion engine 1 and in order thus to purge the soot catcher 5, then the question of terminating this closing of the intake butterfly valve 8 and of thus terminating throttling of the intake passage 2 of the diesel internal combustion engine 1 arises, and thus the flow of control passes to enter next the SET $C_2$ TO $C_2$ PLUS ONE block, which will be explained later, and otherwise if the result of the decision in this first IS F EQUAL TO ONE? decision block is NO, i.e. if in fact at the current time the intake butterfly valve 8 is not in the state of being closed, i.e. is not in the state of being rotated in the counterclockwise direction in FIG. 1 in order to perform intake throttling for the diesel internal combustion engine 1 and in order thus to purge the soot catcher 5, then the flow of control passes directly to the RESET end of this algorithm. In other words, in this NO branch from this first IS F EQUAL TO ONE? decision block, since it is decided at this point that currently purging of the soot catcher 5 is not being performed, therefore at this point no particular action needs to be taken. Therefore, the flow of control passes directly to the RESET block, as stated above.

On the other hand, in the YES branch from this first IS F EQUAL TO ONE? decision block, since it is decided at this point that in fact at the current time the intake butterfly valve 8 is in the state of being closed, i.e. of being rotated in the counterclockwise direction in FIG. 1 in order to perform intake throttling for the diesel internal combustion engine 1 and in order thus to purge the soot catcher 5, then the question of ceasing this closing of the intake butterfly valve 8 and of thus ceasing throttling of the intake passage 2 of the diesel internal combustion engine 1 arises. According to the principles of the present invention, as explained above, a certain time delay of the order perhaps of a few tens of seconds should be allowed to elapse from the time that first either the engine revolution speed N or the engine load R as indicated respectively by the engine revolution speed sensor 21 and the engine load sensor 20 transits from its range in which it is appropriate for throttling of the intake passage 2 of the diesel internal combustion engine 1 in order to cause purging of the soot catcher 5 to be performed to its range in which it is not appropriate for throttling of the intake passage 2 of the diesel internal combustion engine 1 in order to cause purging of the soot catcher 5 to be performed, before actual cessation of such intake throttling; in other words, the intake butterfly valve 8 should not be immediately moved to its position to not throttle the intake passage 2 of the diesel internal combustion engine as soon as the circumstances for purging of the soot catcher 5, as defined only in terms of the instantaneous current values of the engine revolution speed N and the engine load R, become not appropriate therefor, but instead the aforesaid time delay of the order of a few tens of seconds should be allowed to elapse first. Thus, a time counting system is established to measure this appropriate time delay, in the operation of the algorithm for the control device 19 whose flow chart is shown in FIG. 2, and this is performed by the use of a second time counter $C_2$, whose value is maintained at zero except during the elapsing of the aforesaid time delay, as will be seen hereinafter, and which is used for counting the number of iterations round the cycle of the program whose flow chart is shown in FIG. 2 that have been performed, while waiting to cease intake throttling.

Thus the flow of control passes from the YES branch of the first IS F EQUAL TO ONE? decision block to enter next the SET $C_2$ TO $C_2$ PLUS ONE block. In this SET $C_2$ TO $C_2$ PLUS ONE block, the value of the above explained second counter $C_2$ is increased by one. If the program the flow chart of whose algorithm is shown in FIG. 2 is executed about once every second, as is typical as explained above, thereby the value in the second counter $C_2$ is therefore approximately equal to the waiting time in seconds since first it was decided that purging of the soot catcher 5 was no longer appropriate, i.e. is approximately equal to the time in seconds since first either the engine revolution speed N or the engine load R as indicated respectively by the engine revolution speed sensor 21 and the engine load sensor 20 transited from its range in which it was appropriate for throttling of the intake passage 2 of the diesel internal combustion engine 1 in order to cause purging of the soot catcher 5 to be performed to its range in which it is not appropriate for throttling of the intake passage 2 of the diesel internal combustion engine 1 in order to cause purging of the soot catcher 5 to be performed; since the value of the second counter $C_2$ is kept at zero except during this waiting time, as will be apparent from what follows. After this count, from this SET $C_2$ TO $C_2$ PLUS ONE block, the flow of control passes to enter next the IS $C_2$ EQUAL TO $C_b$? decision block.

In this IS $C_2$ EQUAL TO $C_b$? decision block, a decision is made as to whether or not the value of the second counter $C_2$ has yet reached a trigger value of $C_b$, which exemplarily may again be equal to about ten to thirty or so. Thus, this IS $C_2$ EQUAL TO $C_b$? decision block serves to decide whether or not the aforesaid appropriate time period has elapsed from the time point at which first it was decided that purging of the soot catcher 5 was no longer appropriate, i.e. it approximately equal to the time in seconds since first either the engine revolution speed N or the engine load R as indicated respectively by the engine revolution speed sensor 21 and the engine load sensor 20 transits from its range in which it was appropriate for throttling of the intake passage 2 of the diesel internal combustion engine 1 in order to cause purging of the soot catcher 5 to be performed to its range in which it is not appropriate for throttling of the intake passage 2 of the diesel internal combustion engine 1 in order to cause purging of the soot catcher 5 to be performed. If the result of the decision in this IS $C_2$ EQUAL TO $C_b$? decision block is NO, i.e. if this time period has not yet elapsed and thus it is not yet appropriate actually to cease throttling of the intake manifold 2 of the diesel internal combustion engine 1 in order to heat up the exhaust gases thereof in order to start purging the soot catcher 5, then more time should be allowed to elapse, and accordingly the flow of control passes directly to the RESET block, thus terminating this iteration of the program for the control device 19 whose flow chart is shown in FIG. 2; and otherwise if the result of the decision in this IS $C_2$ EQUAL TO $C_b$? decision block is YES, i.e. if at the present moment the appropriate time period has just now elapsed and thus it now for the first time has become appropriate actually to cease throttling of the intake manifold 2 of the diesel internal combustion engine 1 in order to heat up the exhaust gases thereof in order to start purging the soot catcher 5, then no more time should be allowed to elapse, then the flow of control passes to enter next the SET F TO ZERO AND $C_2$ TO ZERO AND CEASE INTAKE THROTTLING BY VALVE 8 block.

In this SET F TO ZERO AND $C_2$ TO ZERO AND CEASE INTAKE THROTTLING BY VALVE 8 block, the value of the flag F is set to zero, in order to indicate that intake throttling is not currently being performed and thus that the soot catcher 5 is not currently being purged, and the value of the second counter $C_2$ is also reset to zero, and also a voltage low signal is sent by the control device 19 (via appropriate digital to analog converters or the like, as mentioned before, which are not shown) to the electrically actuated two way switching valve 17, thus causing the ports "a" and "c" of said electrically actuated two way switching valve 17 to be communicated together while the port "b" is not communicated to any other port, and thus causing air at atmospheric pressure to be supplied via the vacuum conduit 18 to the diaphragm chamber 13 of the diaphragm actuator device 10, thus causing the diaphragm 12 thereof and the actuating rod 11 to be shifted to their leftwards positions as seen in the figure, thus rotating the intake butterfly valve 8 in the clockwise direction to its maximum extent as seen in the figure and thus causing intake throttling for the intake manifold and passage 2 of the diesel internal combustion engine 1 to be performed to its minimum amount, thus ceasing the heating up of the exhaust gases of said diesel internal combustion engine 1 and thus ceasing the consequent purging of the soot catcher 5. In a similar fashion as described previously, this low voltage value electrical signal is maintained by some device such as for example the flip flop or the like, previously mentioned, incorporated in the control device 19 but not shown, so as to keep said electrically actuated two way switching valve 17 in its state as mentioned above wherein its port "a" is communicated to its port "c" and its port "b" is not communicated to any other port, until a block which alters said low value electrical signal to said electrically actuated two way switching valve 17 in the algorithm for the operation of the control device 19 whose flow chart is shown in FIG. 2 is obeyed, i.e. until the block SET F TO ONE AND $C_1$ TO ZERO AND COMMENCE INTAKE THROTTLING BY VALVE 8 (the function of this block has been described earlier in detail) is obeyed. From this SET F TO ZERO AND $C_2$ TO ZERO AND CEASE INTAKE THROTTLING BY VALVE 8 block, the flow of control passes to enter next the RESET block, thus terminating this iteration of the program for the control device 19 whose flow chart is shown in FIG. 2.

Now, in summary, the first advantage of the present invention and in particular of the method described above is that, when the point which represents the current operational condition of the diesel internal combustion engine 1 in the phase space whose dimensions are engine load and engine revolution speed transits from the first region in said phase space which represents non intake throttling combinations of engine load and engine revolution speed of said diesel internal combustion engine to the second region in said phase space which represents intake throttling combinations of said engine load and engine revolution speed of said diesel internal combustion engine, i.e. to said rectangle in said phase space defined by the line corresponding to 30% engine load and the line corresponding to 2000 revolutions per minute engine revolution speed, in the above described exemplary case, then the operation of said intake throttling valve 8, to throttle said air intake passage 2 and thereby to heat up the exhaust gases of said diesel internal combustion engine 1 so as to purge said soot catcher 5 by causing the combustion of soot particles which have accumulated in it, is not immediately started, but instead a certain time delay equal to said first time period defined by the value $C_a$ is allowed to lapse, before said throttling action of said intake throttling valve 8 is started. Thereby it is avoided that undue smoke and soot should be generated during this first time period $C_a$ after first the aforesaid point in the above defined phase space has transited from said first non intake throttling region to said second intake throttling region, of which otherwise there might be a danger. Further, in the event that said point in said phase space wanders to and fro between said first non intake throttling region and said second intake throttling region quickly and repeatedly, this time delay $C_a$ before deploying the intake throttling effect of said intake throttling valve 8 means that oscillation between the intake throttling position and the non intake throttling position of said intake throttling valve 8 is positively avoided, which is very beneficial for improving the drivability and operability of the diesel internal combustion engine 1, as well as for preserving the quality of the exhaust emissions thereof.

Further, the second advantage of the present invention and in particular of the method described above is that, when said point which represents the current operational condition of said diesel internal combustion engine 1 in said phase space transits from said second region in said phase space representing intake throttling combinations of engine load and engine revolution speed of said diesel internal combustion engine 1 to said first region in said phase space representing non intake throttling combinations of engine load and engine revolution speed of said diesel internal combustion engine 1, the operation of said intake throttling valve 8, to throttle said air intake passage 2 and thereby to heat up the exhaust gases of said diesel internal combustion engine 1 so as to purge said soot catcher 5 by causing the combustion of soot particles which have accumulated in it, is not immediately stopped, but instead another certain time delay equal to said second time period defined by the value $C_b$ is allowed to lapse, before said throttling action of said intake throttling valve 8 is stopped. Thereby, since there is no substantial risk of undue smoke and soot being generated during this second time period after first the aforesaid point in the phase space has transited from said second region to said first region, even though intake throttling is continued, it is advantageously made possible to utilize this time period defined by $C_b$ for purging of the soot catcher 5, which improves the efficiency and effectiveness of the purging of the soot catcher 5. Further, in the event that said point in said phase space wanders to and fro between said first non intake throttling region and said second intake throttling region quickly and repeatedly, this time delay $C_b$ before ceasing the deployment of the intake throttling effect of said intake throttling valve 8 means that oscillation between the intake throttling position and the non intake throttling position of said intake throttling valve 8 is positively avoided, which is again very beneficial for improving the drivability and operability of the diesel internal combustion engine 1, as well as for preserving the quality of the exhaust emissions thereof.

Now, in fact, these two features of the present invention are distinct, and each could be utilized independently of the other, although in the shown preferred embodiment they are in fact utilized together. Both of these features come under the single inventive concept of allowing a certain time delay between the actual transition of the aforesaid point in the phase space from one of these regions to the other and the actual implementation of the implied and consequent change in position of the intake throttling valve 8. Further, although in the shown preferred embodiment of the present invention the first time period and the second time period are in fact substantially constant in all circumstances, this is not to be considered as limitative of the present invention; it would be easy for the value $C_a$ and/or the value $C_b$ to be varied, during the execution of the algorithm whose flow chart is shown in FIG. 2, according to circumstances. Such as modification would be quite within the scope of the present invention.

Yet further, although in the shown preferred embodiment the engine operational parameters that were used to define the aforesaid phase space within which the intake throttling and the non intake throttling regions (which are of course one another's complements) were defined were engine load and engine revolution speed, in fact this is not to be considered as a limitation of the present invention. A different and/or more complicated phase space could be considered; for example, engine cooling water temperature could be a third dimension of such a phase space. However, the utilization of engine load and engine revolution speed only as the two dimensions of a two dimensional phase space makes for ease of computation and of implementation of the algorithm whose flow chart is shown in FIG. 2. Further, the fact that the second region in said phase space which represents intake throttling combinations of said engine load and engine revolution speed of said diesel internal combustion engine is simply the rectangle in said phase space defined by the line corresponding to 30% engine load and the line corresponding to 2000 revolutions per minute engine revolution speed, in the above described exemplary case, as a matter of course makes the determination whether said point in said phase space lies in said rectangular second region representing intake throttling combinations of engine load and engine revolution speed or in said first region in said phase space representing non intake throttling combinations of engine load and engine revolution speed easy to perform. Thereby the easy applicability of the method according to the present invention is promoted. However, of course, this feature is also not to be taken as limitative of the present invention, but is a useful specialization thereof.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. In a diesel internal combustion engine including an exhaust system having a soot particle catcher, an intake manifold and an air throttle valve positioned in said intake manifold for throttling the flow of air through said intake manifold and for raising the temperature of exhaust gases flowing through said exhaust system to purge said soot particle catcher by incineration, a method of controlling said throttle valve comprising repeatedly performing the steps of:

measuring the revolution speed of the engine;
measuring the load of the engine;
determining when the engine is in a first operating condition wherein the engine revolution speed is at least equal to a predetermined revolution speed limit value and the engine load is not higher than a predetermined engine load limit value, said determination being based upon the measured revolution speed and engine load;

closing said throttle valve only when said engine has been operating in said first condition for a predetermined first time length;

opening said throttle valve after said engine has not been operating in said first condition for a predetermined second time length; and opening said throttle valve when said soot particle catcher has been fully purged.

2. The method of claim 1 wherein said first time length is measured by counting the number of repetitions of said steps in which it is determined that said engine is operating in said first condition.

3. The method of claim 1 wherein said second predetermined time is measured by counting the number of repetition of said steps in which it is determined that said engine is not operating in said first condition.

4. In a diesel internal combustion engine including an exhaust system having a soot particle catcher, an intake manifold and an air throttle valve positioned in said intake manifold for throttling the flow of air through said intake manifold and for raising the temperature of exhaust gases flowing through said exhaust system to purge said soot particle catcher by incineration, a system for controlling the throttle valve, said system comprising:

(a) an engine revolution speed sensor which responds to the revolution speed of the engine and outputs an engine revolution speed electrical signal representative of the revolution speed of the engine;

(b) an engine load sensor which responds to the load of the engine and outputs an engine load electrical signal representative of the load of the engine; and (c) an electronic computer connected to said engine revolution speed sensor for receiving said engine revolution speed electrical signal, connected to said engine load sensor for receiving said engine load electrical signal, said computer further including flag means having a first flag condition when a purging operation is being performed and having a second flag condition when a purging operation is not being performed, a first time counting means which counts a first time duration during which said engine is operating in a first engine condition wherein the engine revolution speed is at least a predetermined revolution speed limit value and the engine load is not higher than a predetermined engine load limit value, said computer further including a second time counting means which counts a second time duration during which said engine is not operating in said first engine condition, said computer further including means to judge the completion of a purging operation of said soot catcher, the computer including means to control the position of said throttle valve as a function of the repeated performance of the sequence of:

(c1) determining when said engine is operating in said first engine condition, generating a first electrical signal when said engine is operating in said first engine condition and generating a second electrical signal when said engine is not operating in said first engine condition, (c2) generating an electrical signal closing said throttle valve only when said first electrical signal has been generated for said first time duration and when said flag means is in said first flag condition, (c3) generating an electrical signal for opening said throttle valve when said second electrical signal has been generated for said second time duration and when said flag means is in said second flag condition, and (c4) generating an electrical signal for opening said throttle valve when said judging means judge the completion of the purging operation of said soot catcher.

5. The system of claim 4 wherein said first time counting means comprises means to count the number of repetitions of said steps in which said first electrical signal is generated.

6. The system of claim 4 wherein said second time counting means comprises means to count the number of repetitions of said steps in which said second electrical signal is generated.

* * * * *